United States Patent [19]
Fogarty

[11] 4,024,777
[45] May 24, 1977

[54] AUTOMATICALLY INDEXABLE CUTTING TOOL

[76] Inventor: Derrell Jean Fogarty, 1754 Bayram, Houston, Tex. 77055

[22] Filed: June 3, 1976

[21] Appl. No.: 692,286

[52] U.S. Cl. ............................ 82/36 A; 29/35.5; 74/826; 408/35
[51] Int. Cl.² ............................................ B23B 29/24
[58] Field of Search ............. 82/36 A; 29/568; 74/826; 29/35.5, 42; 408/713, 35

[56] References Cited
UNITED STATES PATENTS

| | | | |
|---|---|---|---|
| 714,841 | 12/1902 | Wells | 29/42 |
| 3,449,990 | 6/1969 | Harman | 82/36 A |
| 3,461,525 | 8/1969 | Gourley | 82/36 A |
| 3,611,846 | 10/1971 | Jeanneret | 29/42 |
| 3,838,500 | 10/1974 | Wirfelt | 29/568 |
| 3,981,607 | 9/1976 | Jorgensen | 408/713 |

*Primary Examiner*—Leonidas Vlachos
*Attorney, Agent, or Firm*—Browning, Bushman & Zamecki

[57] ABSTRACT

A cutting tool comprises a cutter assembly including a cutting implement having a cutting surface and a shank extending longitudinally from the cutting implement. The shank is received in a bore in a housing assembly and is longitudinally extendable and retractable therein. Guide surfaces interengageable between the cutter assembly and the housing assembly automatically rotate the cutter assembly upon extension and retraction of the shank in the housing bore to change the position of the cutting surface.

14 Claims, 4 Drawing Figures

AUTOMATICALLY INDEXABLE CUTTING TOOL

BACKGROUND OF THE INVENTION

1. Field of the Invention

The present invention relates to cutting tools, such as are used to machine a workpiece being turned on a lathe, in which one or more cutting surfaces of a cutting implement must be rotationally indexed. The invention is particularly well adapted to the indexing of cutting bits having a number of cutting surfaces which are to be successively brought into a cutting position with respect to a holder or housing which mounts the bit. Such indexing may be necessary, for example, to present a new cutting surface to the work when one has become worn.

In the past, such indexing has been performed manually. In particular, when one cutting surface of a bit has been used as desired, the machining operation is temporarily suspended while the bit is loosened on the holder, turned to present a new cutting surface to the work, and then re-tightened on the holder. This requires expensive loss of operating time. Additionally, it is inconvenient and even dangerous for the personnel who handle the bit since the latter becomes quite hot during use. Accordingly, there has been a need for a mechanism for automatically rotationally indexing a cutting implement, especially for indexing a cutting bit having a plurality of cutting surfaces so as to successively bring these surfaces into cutting position.

2. Description of the Prior Art

U.S. Pat. No. 3,838,500 to Wirfelt discloses a bit holder in which a new cutting surface is provided by completely ejecting the used bit and bringing a new one into place from a storage magazine.

U.S. Pat. No. 3,182,534 to Hoffman discloses a manually indexable bit in which a disc-like cutter is clamped in place between two plates. To change the cutting surface, a screw is loosened, one of the clamping plates is retracted slightly, and the cutter is manually rotated and then re-clamped.

U.S. Pat. Nos. 3,449,990 to Harman and 3,461,525 to Courley both disclose turret assemblies for indexing a tool holder so as to bring different bits into cutting position or to change the orientation of a bit. Each of these devices is quite complicated and involves a number of relatively moving parts. To effect the indexing, in either of the two devices, an actuating handle must be moved arcuately.

SUMMARY OF THE INVENTION

The present invention provides a cutting tool in which the bit or other cutting implement may be rotationally indexed automatically. Additionally, the present invention provides for such indexing by translation of a longitudinal force partially into a rotational force. The tool of the invention is relatively simple and may comprise as few as two parts which move relatively during the indexing operation.

In particular, the cutting tool of the invention comprises a cutter assembly comprising a cutting implement, such as a bit, having a cutting surface, and a shank extending longitudinally from the cutting implement. A holder or housing assembly has a bore therein for receipt of the shank. Drive means are provided for longitudinally extending and retracting the shank in the bore of the housing. Guide surfaces interengageable between the cutter assembly and the housing assembly automatically rotate the cutter assembly upon extension and retraction of the shank in the housing bore by translating a portion of the longitudinal force involved into a rotative force.

In a preferred embodiment of the invention, the guide surfaces are provided by a pin carried by the housing and extending into the bore and by radially offset areas on the exterior of the cutter shank which form shoulders therebetween for abutment with the sides of the pin. The shoulders may define two opposed sets of longitudinally opening notches, the number of notches in each set corresponding to the number of cutting surfaces on the bit. Then, as the shank is extended, the pin may move out of one notch and strike an opposed longitudinally and circumferentially inclined surface partially defining one of the notches of the other set. Upon continued extension of the shank, this surface translates a portion of the longitudinal force into rotational force thus causing the cutter assembly to rotate about its own axis until the pin strikes a longitudinal stop surface also partially defining the latter notch. The shank is now retracted, whereupon the pin strikes an oppositely inclined connecting surface between the open end of the first notch and the open end of an adjacent notch of the first set. Thus the connecting surface effects further rotation of the cutter assembly in the same direction while guiding the pin into the second notch of the first set. The cutter assembly will then be fixed against further rotation until the shank is once again extended and retracted in the housing bore.

The preferred embodiment also includes a seating surface, which may be in the form of an angular shoulder, on the housing for abutment with a generally radially directed surface of the bit. Fixing means, such as wedge means, cooperative between the cutter assembly and the housing assembly, are provided for automatically urging the bit toward the seating surface during retraction of the shank.

The drive means is preferably hydraulic or pneumatic, with a piston being formed on the cutter shank, and the bore of the housing being adapted to serve as a corresponding cylinder. Thus there are only two relatively moving parts in operation of the device, the cutter assembly and the housing assembly. The hydraulic or pneumatic drive means may be quickly and automatically operated by a programming unit and, in any event, requires little or no loss in machining time.

It is thus a principal object of the invention to provide an automatically indexable cutting tool.

Another object of the invention is to provide a cutting tool in which a cutting implement is automatically indexed by translation of longitudinal force into rotational force.

A further object of the present invention is to provide automatic fixing means in an automatically indexable cutting tool.

Still another object of the invention is to reduce or eliminate losses in machining time during changing of the cutting surface of a cutting tool.

Yet a further object of the present invention is to provide a relatively simple automatic indexing mechanism having a minimum number of relatively moving parts.

Still other objects, features, and advantages of the present invention will be made apparent by the following description of a preferred embodiment, the drawings, and the claims.

DESCRIPTION OF THE PREFERRED EMBODIMENTS

Figure 1:
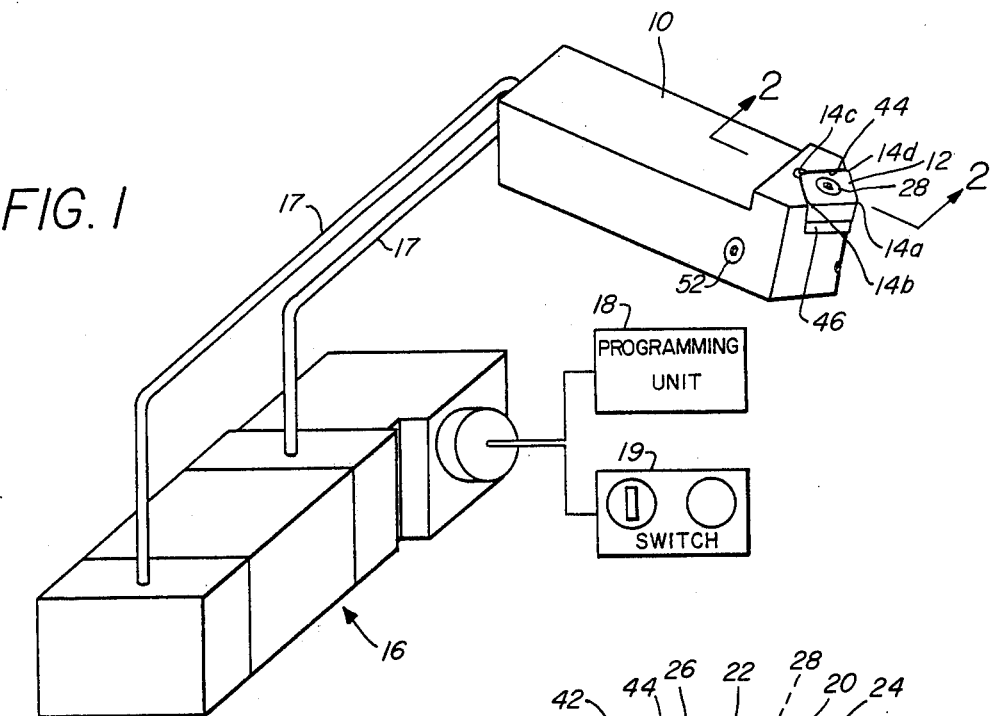
FIG. 1 is a perspective view of a tool holder, and drive means, in accord with the present invention, with activating means shown diagrammatically.

Referring now to FIG. 1, there is shown a tool holder 10 which serves as a housing for a cutter assembly including a bit 12. The bit 12 has four symmetrically arranged cutting surfaces or edges 14a–14d, surface 14a being shown in cutting position. Drive means comprising a power supply assembly 16 including a source of hydraulic or pneumatic fluid, a pump, etc., is connected to the tool holder 10 by conduits 17 to effect automatic indexing of the bit 12 in a manner to be more fully described below. A programming unit 18 is in turn connected to the power supply assembly 16 so that the operation may be programmed, e.g. so that the bit 12 will be automatically indexed at given intervals. A switch 19 is also connected to the power supply assembly 16 to serve as a manual override to the unit 18. In some embodiments, switch 19 alone might be used.

Figure 2:
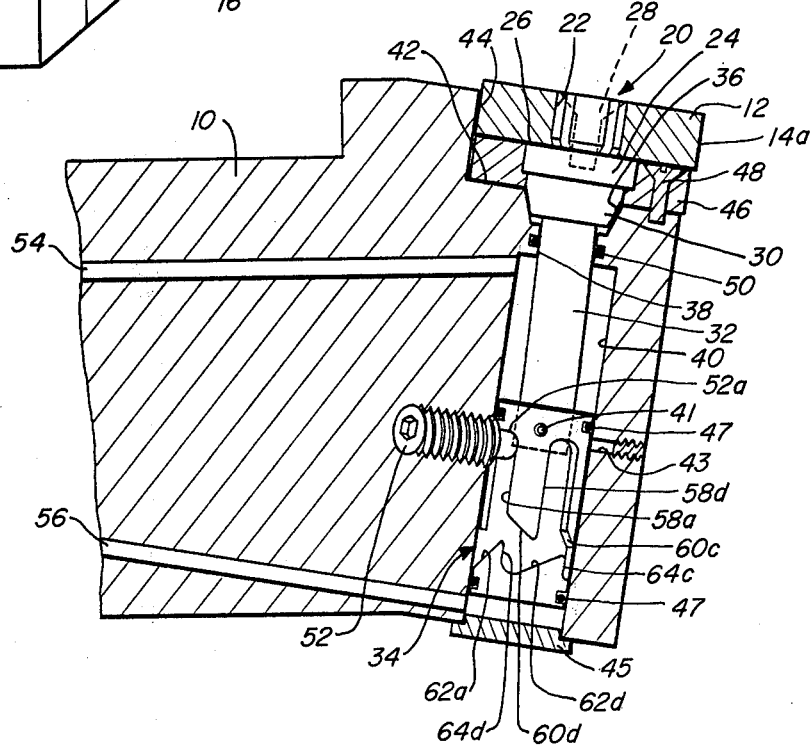
FIG. 2 is a cross-sectional view on lines 2—2 of FIG. 1 showing the cutter assembly and a portion of the tool holder prior to indexing.

Referring now to FIG. 2 it can be seen that, in addition to the bit 12, the cutter assembly includes a shank extending longitudinally from the bit 12 into a bore in the tool holder 10. The shank includes a collet assembly 20 which extends through a central aperture 22 in the bit 12. Just below the collet assembly 20, the shank includes a short cylindrical section 24 which forms an upwardly directed shoulder 26. The bit 12 is seated on the shoulder 26 and the collet assembly 22 expanded by a screw 28 to securely fasten the bit to the shank.

Below the short cylindrical section 24, the shank comprises a generally conical section 30, a reduced diameter elongate cylindrical stem section 32, and a large diameter cylindrical piston section 34. The bore in the tool holder 10 includes an upper conical section 36 adapted to seat the conical section 30 of the shank, a short reduced diameter cylindrical section 38 which slidably receives the stem section 32, and a large diameter elongate cylindrical section 40 which serves as a cylinder for the piston 34. As used herein, terms such as "radial," "longitudinal," "circumferential," etc. will be generally construed with respect to the shank 24, 30, 32, 34 and the bore 36, 38, 40.

Just above the conical section 36 of the bore, the tool holder 10 is cut away to form an upwardly axially directed face 42 and a generally radially directed L-shaped seating shoulder 44. A heat shield 46 is interposed between the bit 12 and the face 42 and is secured to the face 42 by a set screw 48.

The piston section 34 is manufactured separately from the remainder of the shank and is emplaced in the large cylindrical section 40 of the bore from the lower end. The remainder of the shank is emplaced in the bore from the upper end so that the end of stem section 32 extends into the piston section 34 as shown in dotted lines. The stem section 32 may then be secured to the piston section by a pin 41 inserted through an opening 43 in the tool holder. Opening 43 is later plugged as shown. Stem section 32 may alternatively be affixed to piston section 34 in other ways such as by a threaded connection therebetween. The end of cylindrical section 40 of the bore is closed by a plug 45. The piston section 34 has O-rings 47 disposed in annular grooves adjacent its opposite ends to seal against the cylinder 40. An O-ring 50 is disposed in an internal annular groove in cylindrical section 38 of the bore to seal against stem section 32.

A pin member 52 is threaded into an opening in the tool holder so that its reduced diameter end portion 52a extends into the cylindrical section 40 of the bore. The piston section 34 of the shank has external radially offset areas, i.e. a radially upset area generally adjacent each end of the piston section 34 and a radially inset area therebetween. The end 52a of pin 52 is received in the radially inset area so that it may abut the shoulders which are formed between the upset and inset areas.

A pair of fluid passageways 54 and 56 extend through the tool holder to respective opposite ends of the cylinder 40. Each of the lines 17 from the power supply assembly 16 is communicatively connected to a respective one of the passageways 54 or 56. Fluid may be injected through passageway 56 and vented through passageway 54 to extend the shank of the cutter assembly in the bore of the tool holder, and the procedure may be reversed to retract the shank. The pin end 52a and the shoulders formed between the radially offset areas of the piston section 34 act as guide surfaces to translate a portion of the longitudinal force exerted by the fluid into rotational force so that, upon each extension and retraction of the shank, the bit 12 is indexed to move one of the cutting surfaces 14a–14d out of cutting position and bring the next cutting surface into cutting position.

In particular, the shoulders formed between the radially offset areas of the piston section define a set of four parallel downwardly opening notches 58a–58d (three of which are shown) symmetrically circumferentially spaced around the piston section. Each of these notches has longitudinally extending side edges and is slightly wider than the pin end 52a so that end 52a may be received in the notch whereupon longitudinal movement of the shank, but not rotational movement, will be permitted. Adjacent ones of the notches 58a–58d are connected by respective longitudinally and circumferentially inclined connecting surfaces 60a–60d (three of which are shown).

The shoulders between the radially offset areas of piston section 34 also define four surfaces 62a–62d (three of which are shown) longitudinally and circumferentially inclined in the opposite direction as surfaces 60a–60d. Each of the surfaces 62a–62d is generally opposed to a respective one of the notches 58a–58d, and extends circumferentially and longitudinally away from that notch so that it also generally opposes an adjacent one of the connecting surfaces 60a–60d. Each surface 62a–62d is connected to a respective longitudinally extending stop surface 64a–64d (three of which are shown) distal the opposed one of notches 58a–58d so that each pair of surfaces 62a and 64a, through 62d and 64d comprise one of a set of four generally upwardly opening notches each of which generally opposes a respective notch 58a–58d and an adjacent connecting surface 60a–60d.

Figure 3:
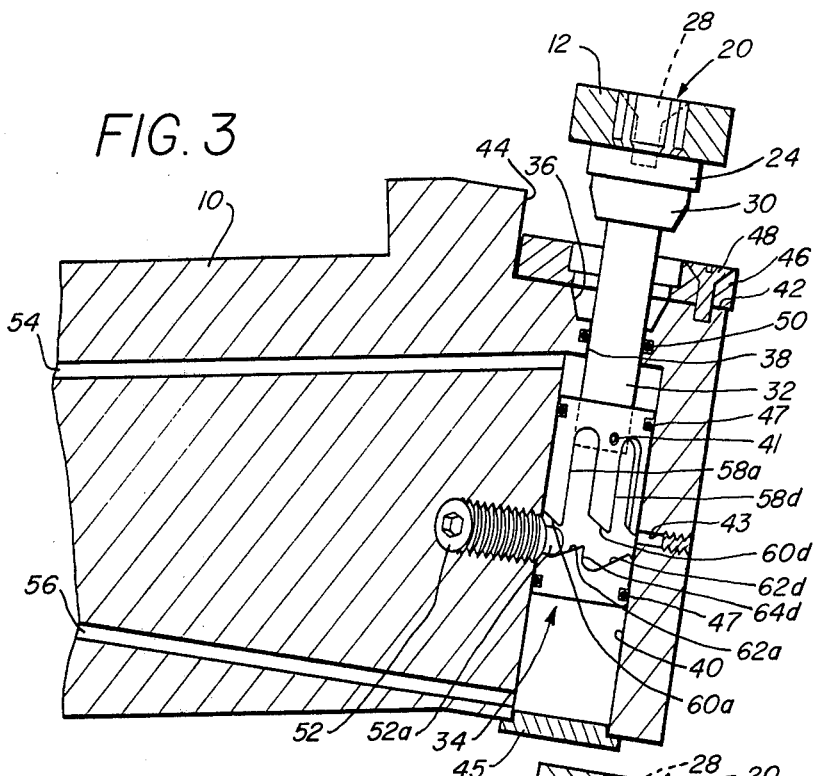
FIGS. 3 and 4 are views similar to that of FIG. 2 showing the apparatus in successive steps of the indexing process.

FIG. 2 shows the aparatus with the shank of the cutter assembly fully retracted in the bore of the tool holder, the cutting surface 14a in cutting position, and the pin end 52a engaged in notch 58a at the closed end of said notch. To index the bit 12, fluid is injected through passageway 56 into the cylinder 40 and vented through passageway 54. Since the notch 58a permits longitudinal movement of the piston section 34, the shank will begin to be extended in the bore of the tool holder. As this extension continues, the pin end 52a will move out of notch 58a and strike the opposed inclined surface 62a. Since surface 62a is inclined downwardly and to the left, as viewed in the drawings, the cutter assembly will be forced to rotate in the counterclockwise direction by the engagement of pin end 52a and surface 62a, a portion of the longitudinal force being translated into rotational force. The length of notch 58a is sufficient that the bit 12 will be clear of the seating shoulder 44 when this rotation begins. Surface 62a slides along pin end 52a until the latter strikes the stop surface 64a and the closed end of the notch formed by surfaces 62a and 64a as shown in FIG. 3. This prevents further extension of the shank of the cutter assembly.

Figure 4:
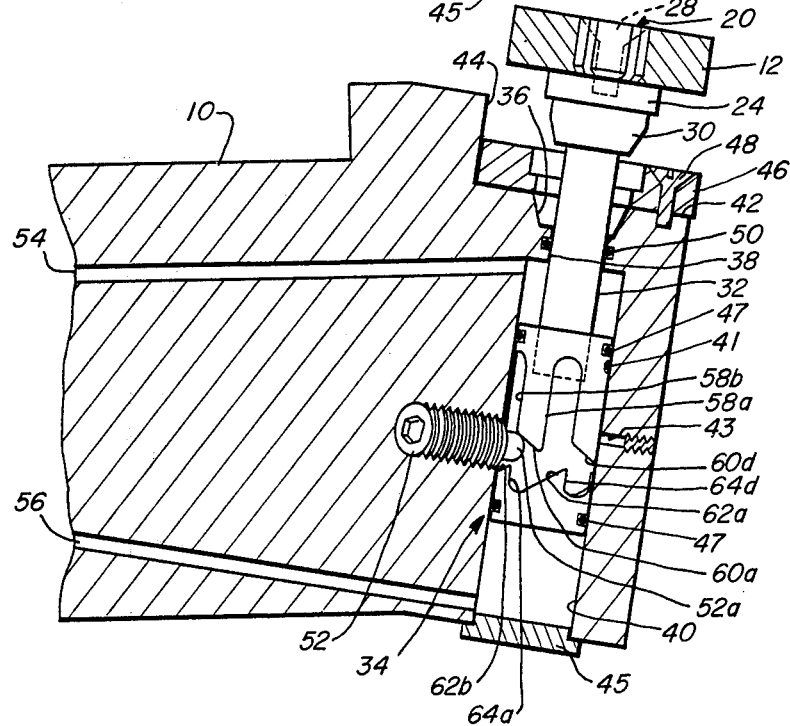

Fluid pressure is now applied to the cylinder 40 through passageway 54 and vented through passageway 56 to retract the shank. As the piston section 34 retracts, the pin end 52a will strike the connecting surface 60a so that further retraction will cause additional rotation in the counterclockwise direction, the interengaged pin end 52a and surface 60a translating a portion of the longitudinal retraction force into rotational force, as shown in FIG. 4. As the surface 60a slides along the pin end 52a, the latter is guided into notch 58b. When the pin end 52a enters the notch 58b, the cutting surface 14b will have rotated into alignment with the cutting position and additional rotation is prevented as the retraction continues and the bit 12 is seated on the tool holder.

Subsequent extensions and retractions of the cutter assembly, will bring successive ones of the cutting surfaces 14a-14d into the cutting position. While the indexing operation has been described in a step-by-step manner, it should be understood that, with proper timing of the power supply means, the indexing occurs almost instantaneously so that interruption of the machining operation being performed by the bit 12 is interrupted insignificantly, if at all. The procedure is further streamlined by the use of the programming unit 18 which automatically actuates the power supply means 16 at predetermined intervals.

Referring again to FIG. 3, it can be seen that the centerline of the conical section 36 of the bore in the tool holder is offset with respect to the remainder of the bore in the direction toward the seating shoulder 44. When the cutter assembly is in its fully extended position as shown, the entire shank, including conical section 30 is coaxial with the remainder of the bore. Stem section 32 is formed of spring metal so that, as the cutter assembly is retracted, the conical section 30 of the shank will be permitted to be wedged into seating engagement with conical section 36 of the bore so that the generally radially directed surfaces of bit 12 generally opposite the surface in cutting position will be firmly urged against shoulder 44 and held in place there while the cutter assembly remains retracted. Thus section 36 of the bore cooperates with section 30 of the cutter shank to serve as a fixing means for the assembly.

Many modifications of the preferred embodiment of the invention shown above may be made without departing from the spirit of the invention. For example, the number of sets of guide surfaces on the piston section 34 could be changed to correspond to bits having more or less than four cutting surfaces. A projection such as pin end 52a might be provided on the piston section 34, rather than on the tool holder, with the radially offset areas being formed on the interior of the cylinder 40. Other modifications might involve changes in the configuration of the guide surfaces, the use of other means for longitudinally extending and retracting the shank of the cutter assembly, etc. Accordingly it is intended that the scope of the invention be limited only by the claims which follow.

I claim:
1. A cutting tool comprising:
   a cutter assembly comprising a cutting implement having a cutting surface and a shank extending longitudinally from said cutting implement;
   a housing assembly having a bore for receipt of said shank, said shank being longitudinally extendable and retractable in said bore;
   and means defining guide surfaces interengageable between said cutter assembly and said housing assembly for automatically rotating said cutter assembly upon extension and retraction of said shank in said bore to change the position of said cutting surface.

2. A cutting tool as defined in claim 1 wherein said cutting implement comprises a cutting bit having a plurality of circumferentially spaced cutting surfaces, said guide surfaces being operative to bring successive ones of said cutting surfaces into a cutting position on said housing assembly upon successive extensions and retractions of said shank.

3. A cutting tool as defined in claim 2 wherein said guide surfaces are disposed generally in said bore and are defined in part by a projection carried by one of said assemblies and in part by radially offset areas on the other of said assemblies forming shoulders between said radially offset areas.

4. A cutting tool as defined in claim 3 wherein said projection comprises a pin carried by said housing assembly and extending into said bore; and wherein said offset areas are formed on the exterior of said shank, the shoulders between said offset areas defining a first longitudinally opening notch, a first longitudinally and circumferentially inclined surface opposed to the open end of said first notch and extending circumferentially past said first notch, a longitudinally extending first stop surface adjacent the end of said first inclined surface distal said first notch, a second notch substantially identical to said first notch and circumferentially spaced therefrom, and means for directing said pin from said first stop surface into said second notch.

5. A cutting tool as defined in claim 4 wherein said pin directing means comprises a first connecting surface interconnecting the open ends of said first and second notches and longitudinally and circumferentially inclined oppositely to said first inclined surface, and wherein said first inclined surface and said first stop surface are joined to form a third notch.

6. A cutting tool as defined in claim 5 wherein said cutting surfaces are symmetrically spaced around said bit; wherein said tool includes a first set of notches substantially identical to said first notch, symmetrically circumferentially spaced around said shank, connected by connecting surfaces substantially identical to said first connecting surface, and symmetrically spaced around said shank; and wherein said tool further includes a second set of notches substantially identical to said third notch and each generally opposed to a respective one of the notches of said first set and an adjacent connecting surface.

7. A cutting tool as defined in claim 2 wherein said housing assembly includes a seating surface for abutment with a generally radially directed surface of said bit when said shank is in its retracted position, said tool further comprising fixing means cooperative between said housing assembly and said cutter assembly for automatically urging said bit against said seating surface upon retraction of said shank.

8. A cutting tool as defined in claim 7 wherein said seating surface includes an angular shoulder.

9. A cutting tool as defined in claim 7 wherein said fixing means includes wedge means.

10. A cutting tool as defined in claim 9 wherein said wedge means includes a conical section of said bore having its centerline offset toward said seating surface with respect to the centerline of the remainder of said bore, and a mating conical section on said shank, said shank being generally concentric with the remainder of said bore and being flexible and resilient adjacent said conical section of said shank.

11. A cutting tool as defined in claim 10 wherein said conical section of said shank is disposed generally adjacent said bit.

12. A cutting tool as defined in claim 1 further comprising drive means for longitudinally extending and retracting said shank in said bore.

13. A cutting tool as defined in claim 12 wherein said drive means includes a piston formed on said shank, said bore being adapted to serve as a cylinder for said piston, and means for selectively applying fluid to said cylinder at either end of said piston.

14. A cutting tool as defined in claim 12 further comprising programming means operatively connected to said drive means for automatically causing extension and retraction of said shank at predetermined intervals.

* * * * *